May 18, 1965  T. C. FRAZIER, JR  3,184,458
PROCESSES FOR PRODUCING TRICHLOROISOCYANURIC ACID
Filed Aug. 11, 1961  2 Sheets-Sheet 1

FIG. I

INVENTOR.
THOMAS C. FRAZIER, JR.
BY
Benjamin Sweedler
ATTORNEY

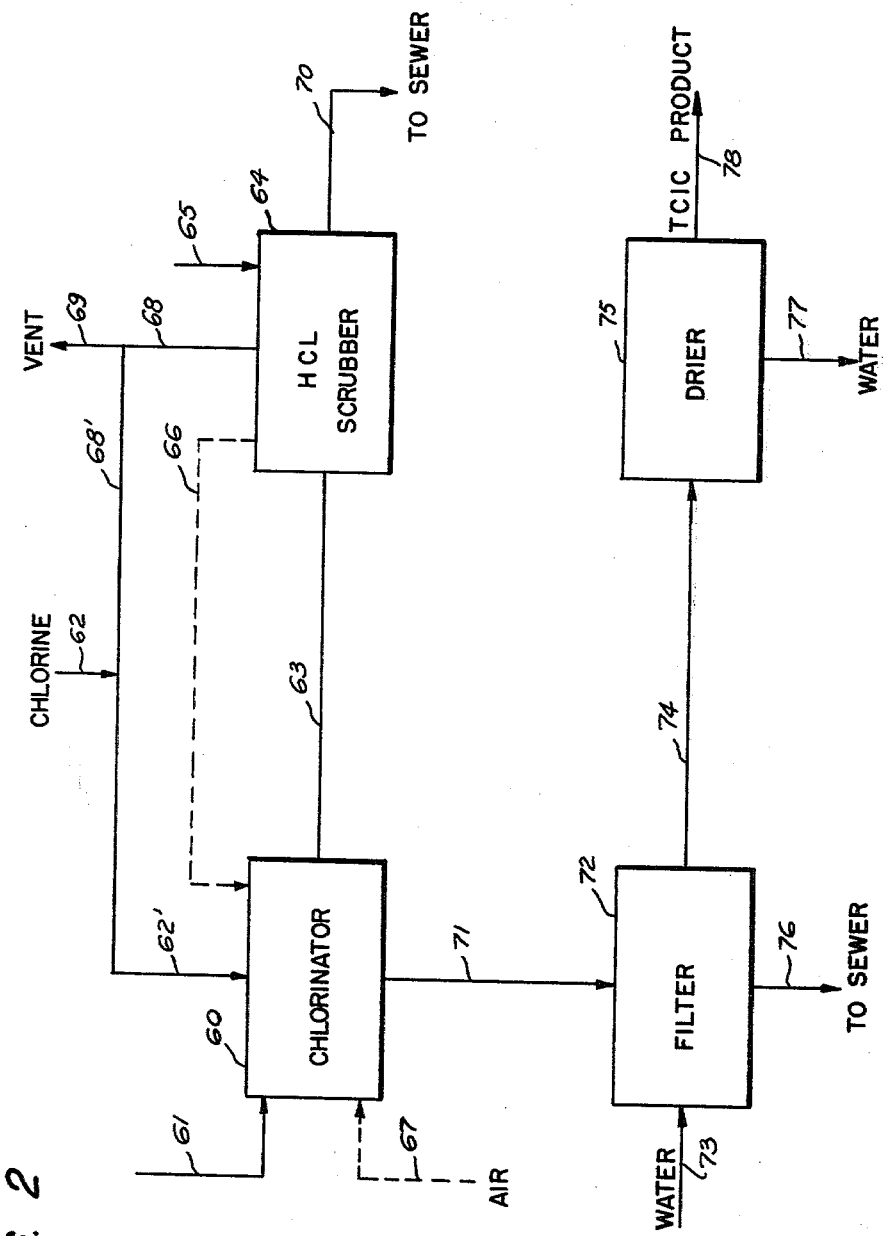

United States Patent Office 3,184,458
Patented May 18, 1965

3,184,458
PROCESSES FOR PRODUCING TRICHLORO-ISOCYANURIC ACID
Thomas C. Frazier, Jr., Hopewell, Va., assignor to Allied Chemical Corporation, New York, N.Y., a corporation of New York
Filed Aug. 11, 1961, Ser. No. 130,936
4 Claims. (Cl. 260—248)

This invention relates to the production of trichloroisocyanuric acid, hereinafter referred to, for the sake of brevity, as TCIC, a commercially important constituent of cleansers, a source of available chlorine, and having other known uses.

In this specification all parts and percentages are given on a weight basis unless otherwise specified.

In the known preparation of TCIC by reacting cyanuric acid with an aqueous solution of an alkali metal hydroxide to produce an aqueous reaction mixture containing a tri alkali metal cyanurate, chlorinating such aqueous mixture to produce a slurry of TCIC, and separating the TCIC from the aqueous slurry by filtration, decantation, centrifugation, or otherwise, nitrogen trichloride ($NCl_3$) is formed. $NCl_3$, when it condenses, forms a yellow oil which is explosive when subjected to shock, organic materials or temperatures of 60° C. or higher. The presence of appreciable quantities of $NCl_3$ in the TCIC product is therefore seriously objectionable. Also, accumulation of $NCl_3$ in the equipment may present explosion hazards.

Various procedures have been suggested for reducing the $NCl_3$ content of the TCIC product, including purification by time consuming and costly acid wash treatments.

It is an object of the present invention to provide a process for the production of TCIC which results in a product substantially free of nitrogen trichloride and this without involving any additional purification treatments of the TCIC product over and above the usual recovery from the TCIC slurry.

It is a further object of this invention to provide such process in which a TCIC reaction product is obtained in high yield, free or substantially free of $NCl_3$.

Other objects and advantages of this invention will be apparent from the following detailed description thereof.

In accordance with the present invention cyanuric acid is reacted, either batchwise or continuously, with an aqueous solution of an alkali metal hydroxide, such as sodium or potassium hydroxide, preferably in the amount of from about 3 to about 3.5 mols of the alkali metal hydroxide per mol of cyanuric acid and in the presence of from 100 to 150 mols of water per mol of cyanuric acid, to form a reaction mixture containg a tri alkali metal cyanurate, the reaction mixture is chlorinated at a temperature of from about —5° to about 45° C., employing from about 3 to about 6 mols of chlorine per mol of cyanuric acid, to produce a slurry containing TCIC and by-product $NCl_3$, the slurry thus produced is stripped with an inert gas to remove the $NCl_3$ either during the chlorination or upon completion of the chlorination, and the TCIC is separated from the resulting stripped slurry.

The utilization of from 3 to 3.5 mols of alkali metal hydroxide per mol of cyanuric acid and from 100 to 150 mols of water per mol of cyanuric acid, followed by the chlorination of the reaction mixture at —5° to 25° C. using from 3 to 6 mols, preferably from 4 to 5 mols of chlorine per mol of cyanuric acid, results in a slurry containing TCIC and by-product $NCl_3$ from which the $NCl_3$ can readily and efficiently be removed as formed or after the chlorination and, equally important, results in the production of TCIC in high yield and excellent purity.

The cyanuric acid employed in the process of this invention is desirably of high purity. The use of a high purity cyanuric acid, say about 99% or higher, results in an improvement in the yield of the TCIC and also in a TCIC product of high chlorine content.

The alkali metal hydroxide, preferably sodium hydroxide for reasons of ready availability and economy, may be used in solid form or as an aqueous solution of any available concentration. Since sodium hydroxide is preferred, the specification hereinafter will refer to sodium hydroxide for the most part, but it will be appreciated that other alkali metal hydroxides may be used. The sodium hydroxide and cyanuric acid are reacted in aqueous solution, employing from about 3 to about 3.5 mols of sodium hydroxide per mol of cyanuric acid. The use of less than 3 mols of sodium hydroxide per mol of cyanuric acid produces low yields of trisodium cyanurate with consequent reduction in the yield of TCIC while the use of more than about 3.5 mols of sodium hydroxide produces, on subsequent chlorination, higher concentrations of nitrogen trichloride. The use of from 3 to 3.5, preferably about 3.45 mols, of sodium hydroxide per mol of cyanuric acid, in the presence of from 100 to 150 mols of water per mol of cyanuric acid gives optimum results. The references herein to the amount of water present in the reaction mixture include water added in the form of an aqueous solution of alkali metal hydroxide, when such solutions are used, as well as water added to the mixture as such.

The reaction between cyanuric acid and sodium hydroxide to form the trisodium cyanurate is exothermic, raising the temperature of the aqueous reaction mixture containing the trisodium cyanurate to about 40° C. This mixture may be cooled to a temperature of from about —5° to about 25°C., preferably from about —5° to about 5° C., prior to chlorination. The cooling is accomplished in a conventional heat exchanger, employing any well known cooling media such as an ice-water bath or refrigerants, e.g., a halogenated aliphatic hydrocarbon, such as the Genetrons ($CCl_2F_2$) or other suitable cooling media.

The chilled trisodium cyanurate reaction mixture is chlorinated in a reaction zone into which chlorine, in liquid or gaseous form, is also fed. The chlorine is mixed with the reaction mixture in the proportion of from about 3 to about 6 mols, preferably from 4 to 5 mols, of chlorine per mol of cyanuric acid. Chlorination is effected at a temperature between about 0° and 45° C., and desirably at about 0° to 5° C. To maintain these temperature conditions the chlorination zone is cooled either by internal or external coolers.

The chlorination is desirably carried out under atmospheric pressures, although pressures up to about 5 atmospheres may be employed. In batch operations, the trisodium cyanurate is charged into the reaction zone and the chlorine added thereto, or recycled therethrough, while maintaining the desired temperature and pressure, over a period of from about 0.5 to about 2.0 hours. In continuous operations, the chlorine and the cyanurate solution are flowed into admixture within the reaction zone, the volume of which zone is so chosen as to provide a residence time of from about 2 to about 4 hours, preferably about 3 hours. Obviously, the volume of the reaction zone employed will depend upon the production capacity desired.

The chlorination as hereinabove described produces a slurry containing TCIC product in high yield, and by-products, chiefly sodium chloride, $NCl_3$, sodium oxychloride, monochloroisocyanuric and dichloroisocyanuric acids; the latter two are hereinafter referred to as MCIC and DCIC, respectively.

In the continuous procedure according to one embodiment of the invention, the product slurry resulting from the chlorination is pumped to a stripper column through which it is passed countercurrent to a stream of an inert gas, such as air, nitrogen, or carbon dioxide. The inert gas stream strips both residual chlorine remaining from the chlorination reaction and the $NCl_3$ product from the slurry. The amount of inert gas passed through the slurry will depend chiefly on the $NCl_3$ and chlorine contents of the slurry and temperature of the stripping gas which may be within the range of from 10 to 25° C. In general from 10 to 15 volumes of inert gas per volume of slurry are passed through the slurry to give substantially complete removal of the $NCl_3$.

Desirably, the continuous procedure is carried out employing two trains of reaction zones and stripper columns, one of which is alternately employed for the chlorination and stripping procedures described above, and the other of which is simultaneously rinsed, successively with water and with a mild reducing agent, such as a solution of sodium sulfite or sodium nitrite. By alternately rinsing the reaction zones and strippers, and carrying out the reaction in the cleansed equipment, say for 4 to 8 hours, before switching to the previously cleansed equipment, accumulation of explosive $NCl_3$ within the equipment is prevented.

In the batch synthesis of TCIC, during the chlorination of the trisodium cyanurate reaction mixture chlorine can be introduced into the body of reaction mixture until the desired amount has been added, while maintaining the temperature within the range specified above. Alternatively, the chlorine can be circulated through the body of reaction mixture, the unreacted chlorine from this body passed through an acid scrubber and the scrubbed chlorine recycled to the reaction zone. Recycle of chlorine as described hereinabove is continued until the chlorine is consumed. Upon completion of the chlorination, the product slurry is stripped with an inert gas, such as air, nitrogen, or carbon dioxide using an amount of inert gas about the same as disclosed above in connection with the continuous procedure. The inert gas stream from the chlorinator passes through an acid scrubber and the scrubbed gas vented to the atmosphere or recycled through the chlorinator. This is repeated several times, during which the $NCl_3$ stripped from the product slurry is decomposed by the acid in the scrubber, and when the scrubbed stripping gas is recycled through the chlorinator, the chlorine resulting from such decomposition is returned to the chlorinator where it aids in completing the chlorination. After the stripping of the $NCl_3$ from the chlorinated reaction mixture is completed, the inert gas containing chlorine and carbon dioxide is vented to the atmosphere or first treated to recover the chlorine and the residual gas vented to the atmosphere.

In both the continuous and batch procedures, the chlorine and stripping gas can be fed simultaneously to the chlorinator, thereby removing nitrogen chloride from the start and as formed. This procedure prevents accumulation of explosive nitrogen trichloride in the process. The exit gas is scrubbed with acid to destroy the $NCl_3$ and vented to the atmosphere or first treated to recover the chlorine which is recycled to the chlorinator and the residual gas vented to the atmosphere.

The stripped slurry resulting from either of the batch or continuous procedures is treated to separate the TCIC therefrom; it may be filtered, centrifuged or otherwise treated to effect such separation. If a filtration procedure is used, the filtrate is discarded or, if desired, recycled to the chlorination zone to convert any incomplete reaction products formed, viz, MCIC or DCIC, to TCIC.

In the accompanying drawings disclosing, for purposes of illustration, without limitation, preferred arrangements of the equipment for carrying out the procedures of this invention:

FIGURE 1 is a diagrammatic layout of one arrangement of equipment for practicing the continuous procedure of this invention; and FIGURE 2 is a block diagram of apparatus for practicing the batch procedure.

Referring first to FIGURE 1, 10 is a storage bin for solid cyanuric acid which is fed through conduit 11 to a conveyor 12. The conveyor 12 feeds the cyanuric acid to a cyanuric acid dissolver 13, which dissolver is equipped with an agitator 14. Caustic soda solution and water are fed to the dissolver 13 through line 15 and admixed with the cyanuric acid to form the reaction mixture containing trisodium cyanurate. The reaction mixture formed in the dissolver continuously overflows, passing through pipe 16 to a cyanurate settler 17. Undissolved cyanuric acid is separated by gravity from the trisodium cyanurate reaction mixture in the settler 17 and is returned through line 18 to the dissolver.

The trisodium cyanurate solution is fed through line 19 to a feed pump 21, which pumps the solution to a feed chiller 22, which may be any well known type of heat exchanger. The trisodium cyanurate solution is cooled from about 40° C. to 0° C. in the feed chiller 22 by means of a refrigerant, e.g., Genetron 12, fed to the feed chiller through line 23, passed in heat exchange relation with the cyanurate solution, and removed through line 24.

The chilled solution is then fed through line 25 into a chlorinator 26 and is admixed therein with chlorine fed from a storage tank 27 through line 28 into the chlorinator. The chlorinator 26 is a jacketed, glass-lined vessel, having a turbine agitator 29 and auxiliary refrigerating coils 30 mounted on the walls thereof. A refrigerant is passed through line 31 through the coils 30 and exits through line 32. One or more reactors 26 may be utilized, arranged for series or parallel flow therethrough.

In the chlorinator 26 the chlorine and trisodium cyanurate react to form an aqueous product slurry of TCIC, which slurry is removed through a dip pipe in the chlorinator and passed through line 33 to a reactor sump tank 34.

The reactor sump tank 34 is a conventional glass-lined vessel having an agitator 35 and a vent for releasing excess chlorine through line 36. The product slurry from the sump tank is fed through line 37 to a feed pump 38 which pumps the slurry through line 39 to a point near the top of a stripper 41. The stripper is a glass-lined packed column into which air is passed through line 42 countercurrent to the TCIC slurry, stripping residual chlorine and nitrogen trichloride formed in the chlorinator 26 therefrom. The gas stream exits through line 43 and the stripped slurry flows through line 44 by gravity to a filter feed tank 45 having an agitator 46 therein. The filter feed tank is constructed of stainless steel, or if desired, may be a glass-lined vessel.

Preferably, a spare train consisting of a chlorinator 26, a reactor sump tank 34, a stripper 41 and a filter feed tank 45 is provided, together with the necessary valving and conduits for alternate operation with the train shown in the drawing. When one such train is operated the other is rinsed, successively with clear water and then with a mild reducing agent, e.g., a solution of sodium sulfite or sodium nitrite to decompose any accumulation of nitrogen trichloride formed in the lines or in the reaction vessels.

The overflow from the filter feed tank 45 is passed through line 47 to a TCIC product filter 48 which can be a conventional rotary drum vacuum filter. Solid TCIC is removed by a conveyor 49 and is transferred to a conventional drier, not shown in the drawing. The filtrate from the TCIC product filter 48 is fed through line 51 to a feed pump 52, which pumps the filtrate through line 53 to the sewer.

In one illustrative arrangement for batch operations shown in FIGURE 2, a trisodium cyanurate solution is charged to a chlorinator 60 through line 61 and is mixed therein with chlorine fed through line 62 and introduced into the chlorinator through branch line 62'.

During the chlorination unreacted chlorine gas exits from the chlorinator 60 through line 63 into an HCl scrubber 64, into which a concentrated hydrochloric acid solution is fed through line 65. The scrubbed gas is recycled through line 66 to the chlorinator 60 until substantially all the chlorine is consumed in the chlorination reaction. Recycle of chlorine in this manner serves to remove $NCl_3$ formed during the reaction in the chlorinator 60, which $NCl_3$ is decomposed in the HCl scrubber 64 to produce chlorine, and which chlorine is introduced into the chlorinator 60 where it is employed in the chlorination reaction.

Upon the completion of the chlorination, the flow of fresh chlorine into line 62 is interrupted and an inert gas, introduced through line 67, is passed through the chlorinated reaction mixture. The gas is fed from the chlorinator 60 through line 63 into the HCl scrubber 64 and the scrubbed gas is recycled to the chlorinator 60 through line 68 and branch lines 68' and 62'. The recycling is repeated several times, during which the $NCl_3$ is stripped from the product slurry in the chlorinator 60, is decomposed in the HCl scrubber 64, and the chlorine resulting from such decomposition is recycled to the chlorinator 60 for reaction with the cyanuric acid or partially chlorinated cyanuric acid in the reaction mixture. After the stripping operation is completed, i.e., substantially all of the $NCl_3$ has been removed from the chlorinated reaction mixture, the inert gas, containing chlorine and carbon dioxide, is vented through line 69 and the residual hydrochloric acid, water and other non-volatiles are removed through line 70 to the sewer or other disposal point.

The product slurry containing TCIC is fed through line 71 to filter 72, which can be a rotary drum filter. The solid TCIC, after washing with water introduced through line 73, is removed from the filter through line 74 and is conveyed to a drier 75. The filtrate and wash water from filter 72 are passed to the sewer or to a suitable disposal point through line 76. The water separated from the TCIC product in the drier 75 is removed through line 77. The dried TCIC product is removed through line 78.

While a hydrochloric acid scrubbing treatment of the inert gas stream containing nitrogen trichloride is preferred, sulfuric acid can be used as a scrubbing medium to decompose nitrogen trichloride. Alternatively, the nitrogen trichloride can be separated from the chlorine by passing the gaseous stream containing these constituents through a bed of finely divided solid porous adsorbent material such as activated alumina, silica gel, alumina gel, kieselguhr, fuller's earth, adsorbent clays and activated carbon which selectively adsorb the nitrogen trichloride. Preferably the solid adsorbent material is coated with a metal chloride such as copper, nickel, cobalt, iron, chromium or strontium chloride. The chlorine, substantially free of the $NCl_3$, is removed from the bed. As such processes for separating $NCl_3$ from chlorine are disclosed in U.S. Patent 2,692,818 granted October 26, 1954, further description thereof is believed unnecessary.

It will be understood that the equipment shown in FIGURES 1 and 2 is provided with conventional control valves for effecting and controlling flow of the reactants, reaction products and inert gas as hereinabove described; these valves have not been shown to avoid unduly complicating the drawings.

The following examples are given for purposes of illustrating preferred embodiments of the present invention. It will be understood the invention is not limited to these examples.

*Example I.—Continuous process*

This example is carried out in apparatus similar to that shown in FIGURE 1. The weights are expressed in pounds per hour.

506 lbs. of cyanuric acid are fed to conveyor 12 and mixed in the cyanuric acid dissolver with 493 lbs. of sodium hydroxide (100% NaOH) and 5,597 lbs. of water.

The reaction is exothermic and the overflow solution passed through pipe 16 reaches a temperature of 40° C. Cyanuric acid not dissolved is settled from the reaction mixture in the settler 17 and the remaining mixture containing 764 lbs. of trisodium cyanurate, 22 lbs. of sodium hydroxide and 5,810 lbs. of water is pumped to the feed chiller 22. The trisodium cyanurate reaction mixture is chilled to 0° C. by a refrigerant (Genetron 12) in the feed chiller 22 and introduced at this temperature into the chlorinator 26.

935 lbs. of liquid chlorine are fed from the chlorine storage tank 27 into the chlorinator 26 having a volume of 430 cu. ft. A refrigerant (Genetron 12) is passed through the refrigerating coils 30 in the chlorinator to cool the reaction mixture so that it leaves the chlorinator at a temperature of 20° C. The chlorine and cyanurate are continuously fed to the chlorinator at a rate such that the residence time of the reaction mixture therein is about 3 hours. The TCIC product slurry is continuously removed through line 33 at a temperature of 20° C. and has the following composition:

| | Lbs. |
|---|---|
| TCIC | 820 |
| Sodium chloride | 719 |
| MCIC and DCIC | 33 |
| $NCl_3$ | 41 |
| Sodium oxychloride | 28 |
| Chlorine | 62 |
| Carbon dioxide | 18 |
| Water | 5,810 |

The slurry is passed into the reactor sump tank 34, from which 20 lbs. of chlorine and 18 lbs. of carbon dioxide are vented through line 36; from tank 34 the slurry is fed through line 37 to feed pump 38, which pumps the slurry, still at a temperature of 20° C., to the stripper 41 at a rate of 13.1 gallons per minute. 1500 pounds of air at the rate of 31 cubic feet per minute, and at a temperature of 25° C., are introduced into the stripper 41 through line 42 and passed countercurrent to the slurry fed to the stripper through line 39. The vapors removed through line 43 and vented to the atmosphere have the following composition:

| | Lbs. |
|---|---|
| $NCl_3$ | 41 |
| Chlorine | 62 |
| Water | 13 |
| Air | 1,500 |

The stripped slurry is passed from the stripper through line 44 and overflows from the filter feed tank 45 at a rate of 13 gallons per minute to the TCIC product filter 48. The slurry fed to the product filter has the following composition:

| | Lbs. |
|---|---|
| TCIC | 820 |
| Sodium chloride | 719 |
| MCIC and DCIC | 33 |
| Hypochlorous acid | 28 |
| Water | 5,797 |

The TCIC product is then removed from the filter on conveyor 49; it has the following composition:

| | Lbs. |
|---|---|
| TCIC | 796 |
| Sodium chloride | 3 |
| Water | 202 |

The filtrate removed from the filter 48 and pumped through line 53 to the sewer has the following composition:

| | Lbs. |
|---|---|
| TCIC | 24 |
| Sodium chloride | 716 |
| MCIC and DCIC | 33 |
| Hypochlorous acid | 28 |
| Water | 6,210 |

TCIC, having a 99% purity, is produced in high yield, i.e., about 90%.

Example II.—Batch process

In this example a 3-neck round bottom glass flask fitted with a mechanical stirrer, a chlorine addition tube, a thermometer and a gas outlet is employed as the reaction vessel. The reaction temperature is controlled by immersing the reaction vessel in an ice-water bath and controlling the rate of chlorine addition during the chlorination.

The reactor is charged with 72.2 mols of water, 0.5 mol of 99% purity cyanuric acid and 1.73 mols of sodium hydroxide. The resulting cyanurate reaction mixture is cooled to a temperature between 0° and 2.7° C. and is maintained at this temperature during the subsequent addition of chlorine. 2.75 mols of chlorine gas are passed into the reactor (chlorine:cyanuric acid ratio is 5.5:1) over a period of 1.21 hours. Excess chlorine gas is passed from the reaction flask through three hydrochloric acid (36% by wt. acid) scrubbers and the scrubbed gas returned to the flask during the chlorination period.

The amount of $NCl_3$ removed from this chlorine gas in the scrubbers is determined by the Solvay method (Solvay Technical and Engineering Service, 3rd ed., 1955, Bulletin No. 12) for determination of $NCl_3$ in chlorine by conversion of $NCl_3$ into ammonium chloride with concentrated hydrochloric acid, followed by a Kjeldahl ammonia procedure. 159.7 milligrams of ammonia are obtained by this procedure, per 0.5 mol of cyanuric acid charged, equivalent to 1.13 grams of $NCl_3$; thus 1.13 grams of $NCl_3$ per 0.5 mol of cyanuric acid charged is removed from the chlorinated reaction mixture by the stream of chlorine passed therethrough during the chlorination.

After the chlorination, 3 mols of nitrogen are passed through the product slurry over a period of 1.21 hours or until all color is removed to strip nitrogen trichloride therefrom and the nitrogen gas stream from the product slurry is passed through the hydrochloric acid scrubbers. Upon completion of this step, analysis of the scrubber contents, employing the Solvay method described above, shows that about 602.9 milligrams of ammonia are obtained per 0.5 mol of cyanuric acid charged, equivalent to 4.26 grams of $NCl_3$.

The crude TCIC slurry has a pH of 5. The TCIC is collected by suction filtration, is washed by slurrying with cold water and the resultant slurry filtered. The filter cake thus produced is dried.

The TCIC product has a melting point range of from 241° to 245° C. and contains 45.29% chlorine by weight (theoretically 45.82%). The TCIC yield based on the cyanuric acid fed is 86.2 mol percent.

Example III.—Batch process

This example is carried out in apparatus such as shown diagrammatically in FIGURE 2.

1356 parts of cyanuric acid, 1479 parts of sodium hydroxide (70% aqueous solution), and 26,080 parts of water are reacted, forming a trisodium cyanurate solution, as described in Example I, and introduced into the chlorinator 60 at a temperature of 0° C. 2357 parts of chlorine, of which 184 parts are formed by the decomposition of $NCl_3$ in the HCl scrubbers 64, are added to the cyanurate solution in the chlorinator 60 over a period of about one hour. During this period the excess unreacted chlorine is passed through the HCl scrubber, and the scrubbed gas is recycled to the chlorinator. After the chlorination, 100 parts of air are swept through the chlorinator 60, are passed through the HCl scrubber 64, and the scrubbed gas returned to the chlorinator 40 times; hence 4000 parts of air sweep through the chlorinator. $NCl_3$ is thus stripped from the mixture in the chlorinator and decomposed in the scrubber; the resulting chlorine is returned, as described above, for further chlorination.

After the air sweep is completed, the air stream is vented to the atmosphere; the vented stream contains 47 parts of carbon dioxide, 10 parts of chlorine, 5 parts of hydrogen chloride and 100 parts of air. The non-volatile residue remaining in the HCl scrubber 64 contains 49 parts of ammonium chloride, one part of chlorine, 281 parts of water and 159 parts of hydrochloric acid.

The slurry remaining in the chlorinator after the chlorination as above described including completion of the air sweep, contains the following ingredients:

| | Parts |
|---|---|
| TCIC | 2,120 |
| DCIC | 160 |
| MCIC | 33 |
| Sodium chloride | 2,076 |
| $NCl_3$ | 20 |
| Chlorine | 130 |
| Sodium oxychloride | 111 |
| Water | 26,703 |

The slurry is fed to the filter 72 and the crude filter cake formed therefrom washed by spraying cold water in the amount of 8650 parts thereon. The combined filtrate and wash water has the following composition:

| | Parts |
|---|---|
| TCIC | 120 |
| DCIC | 160 |
| MCIC | 33 |
| $NCl_3$ | 20 |
| Sodium chloride | 2,076 |
| Sodium oxychloride | 111 |
| Chlorine | 130 |
| Water | 34,973 |

The damp TCIC filter cake containing 2000 parts of TCIC and 380 parts of water (16% water) is dried in drier 75, first at room temperature and then at 90° C., and 2000 parts of product TCIC are recovered.

Example IV.—Batch process with simultaneous chlorination and stripping of $NCl_3$ To a 2-liter glass kettle was added 1917 grams of a 5.26 wt. percent aqueous sodium hydroxide solution. Ninety-three grams of cyanuric acid was dissolved in this solution with stirring and the reactor contents cooled to 1.5° C. Chlorine and nitrogen were introduced at 0.038 mol/minute and 0.0125 mol/minute, respectively. The exit gas was bubbled through a first HCl scrubber for forty-five minutes; this HCl scrubber was removed and replaced by a second scrubber during the last twenty-six minutes of the run. There was collected 0.0035 mol $NCl_3$ in the second scrubber and 0.00015 mol $NCl_3$ in the first scrubber. Final dried trichloroisocyanuric acid yield was 63.2 mol percent based on cyanuric acid fed.

Example V.—Continuous process with simultaneous chlorination and stripping of $NCl_3$ A prepared solution containing 6000 grams water, 324 grams sodium hydroxide and 296 grams cyanuric acid was pumped at 3.6 ml./minute to a one-liter stirred kettle with an overflow exit port which provided 800 ml. of liquid holdup in the reactor. Average residence time in the reactor was 222 minutes. Chlorine gas was fed to the reactor at 0.0129 mol/minute along with 0.0125 mol/minute of nitrogen. The liquid feed contained 0.00139 mol cyanuric acid per minute. The reactor temperature was 12–13° C. The trichloroisocyanuric acid was filtered, and the filter cake washed and dried. Trichloroisocyanuric acid free of $NCl_3$ was thus produced at a rate of 12.7 grams/liter per hour with an overall yield of 68.3 mol percent based on cyanuric acid fed.

It will be noted that the present invention provides a process for the production of trichloroisocyanuric acid in high yield, which results in a product free from nitrogen trichloride, without requiring any additional purification treatment.

What is claimed is:

1. In a process for the production of trichloroisocyanuric acid involving reacting cyanuric acid with an aqueous solution of an alkali metal hydroxide to form a reaction mixture containing a tri alkali metal cyanurate, chlorinating said reaction mixture at a temperature within the range of from about −5° C. to about 45° C. to produce trichloroisocyanuric acid and by-product nitrogen trichloride, the improvement which consists in stripping said reaction mixture with an inert gas to remove said by-product nitrogen trichloride therefrom before recovering the trichloroisocyanuric acid.

2. In a process for the production of trichloroisocyanuric acid involving reacting cyanuric acid with an aqueous solution of an alkali metal hydroxide, in the proportion of from about 3 to about 3.5 mols of the alkali metal hydroxide per mol of cyanuric acid, to form a reaction mixture containing a tri alkali metal cyanurate, chlorinating said reaction mixture at a temperature of from about −5° C. to about 45° C., employing from about 3 to about 6 mols of chlorine per mol of cyanuric acid reacted with the alkali metal hydroxide, to produce a slurry containing trichloroisocyanuric acid, residual chlorine and nitrogen trichloride, the improvement consisting of passing an inert gas through said slurry to strip said residual chlorine and nitrogen trichloride therefrom, and thereafter separating the trichloroisocyanuric acid from the resulting stripped slurry.

3. In a process for the production of trichloroisocyanuric acid involving reacting cyanuric acid with an aqueous solution of an alkali metal hydroxide to form a reaction mixture containing a tri alkali metal cyanurate, and chlorinating said reaction mixture at a temperature within the range of from about −5° C. to about 45° C. to produce trichloroiscyanuric acid and by-prduct nitrogen trichloride, the improvement which consists in passing an inert gas through said reaction mixture during the chlorination thereof to remove by-product nitrogen trichloride from said reaction mixture formed during said chlorination.

4. In a process for the production of trichloroisocyanuric acid involving reacting cyanuric acid with sodium hydroxide in the proportion of from about 3 to about 3.5 mols of sodium hydroxide per mol of cyanuric acid and chlorinating the trisodium cyanurate at a temperature within the range of from about −5° C. to about 25° C., the improvement which consists in carrying out the reaction between the cyanuric acid and sodium hydroxide in the presence of from 100 to 150 mols of water per mol of cyanuric acid, effecting the chlorination employing from about 3 to about 6 mols of chlorine per mol of cyanuric acid reacted with the sodium hydroxide to produce a slurry containing trichloroisocyanuric acid and nitrogen trichloride, stripping this slurry with an inert gas to separate the nitrogen trichloride overhead, and thereafter separating the trichloroisocyanuric acid from the stripped slurry.

References Cited in the file of this patent

UNITED STATES PATENTS

| | | |
|---|---|---|
| 2,964,525 | Robinson | Dec. 13, 1960 |
| 2,969,360 | Westfall | Jan. 24, 1961 |
| 3,073,823 | Merkel et al. | Jan. 15, 1963 |

FOREIGN PATENTS

| | | |
|---|---|---|
| 871,776 | Great Britain | June 28, 1961 |

OTHER REFERENCES

Noyer: Journ. of the Am. Chem. Soc., vol. 42 (1920), pages 2173–2179.